(12) United States Patent
Glicksman

(10) Patent No.: US 8,568,146 B2
(45) Date of Patent: Oct. 29, 2013

(54) BREAST IMPLANT TEACHING MODEL

(76) Inventor: Caroline A. Glicksman, Brielle, NJ (US)

( * ) Notice: Subject to any disclaimer, the term of this patent is extended or adjusted under 35 U.S.C. 154(b) by 214 days.

(21) Appl. No.: 12/874,388

(22) Filed: Sep. 2, 2010

(65) Prior Publication Data

US 2011/0053132 A1    Mar. 3, 2011

Related U.S. Application Data

(60) Provisional application No. 61/239,079, filed on Sep. 2, 2009.

(51) Int. Cl.
*G09B 23/28*    (2006.01)

(52) U.S. Cl.
USPC .............................................. 434/267; 623/8

(58) Field of Classification Search
USPC .............................................. 434/267; 623/8
See application file for complete search history.

(56) References Cited

U.S. PATENT DOCUMENTS

| | | | | |
|---|---|---|---|---|
| 2,082,503 A * | 6/1937 | Meadows | ........................ | 450/57 |
| 4,630,610 A * | 12/1986 | Fletcher | ........................ | 450/77 |
| 4,815,977 A * | 3/1989 | Peters | ........................ | 434/267 |
| 4,828,559 A * | 5/1989 | Greenberg | ........................ | 623/7 |
| 4,854,915 A * | 8/1989 | Luedy | ........................ | 450/31 |
| 4,867,686 A * | 9/1989 | Goldstein | ........................ | 434/267 |
| 5,098,330 A * | 3/1992 | Greenberg | ........................ | 450/55 |
| RE34,353 E * | 8/1993 | Perry et al. | ........................ | 600/300 |
| 6,048,252 A * | 4/2000 | Sebring | ........................ | 450/1 |
| 6,485,308 B1 * | 11/2002 | Goldstein | ........................ | 434/267 |
| 7,419,376 B2 * | 9/2008 | Sarvazyan et al. | ........................ | 434/273 |
| 2003/0236053 A1 * | 12/2003 | Martz | ........................ | 450/39 |
| 2005/0079475 A1 * | 4/2005 | Haque | ........................ | 434/267 |
| 2006/0286525 A1 * | 12/2006 | Haines | ........................ | 434/267 |
| 2009/0208915 A1 * | 8/2009 | Pugh | ........................ | 434/267 |

* cited by examiner

*Primary Examiner* — Gene Kim
*Assistant Examiner* — Joseph B Baldori
(74) *Attorney, Agent, or Firm* — Barlow, Josephs & Holmes, Ltd.

(57) ABSTRACT

A model or mannequin is provided for use in the field of medicine to teach anatomic body structure and demonstrate surgical procedures and techniques. The teaching model is designed as a life size replica of a female torso. The model is designed to be an anatomically correct replica including a torso portion with a fabric chest wall, symmetrical pectoralis major muscle layers that are secured to the chest wall and symmetrical breast tissue layers that are secured over the pectoralis muscle layers. Currently available breast implants are utilized by the educator to demonstrate the placement of the implants in various pockets. If necessary the breast tissue, and muscle layers can be elevated to reveal the deeper tissue layers.

2 Claims, 3 Drawing Sheets

BREAST IMPLANT TEACHING MODEL

CROSS-REFERENCE TO RELATED APPLICATIONS

This application is related to and claims priority from earlier filed U.S. Provisional Patent Application No. 61/239,079, filed Sep. 2, 2009, the contents of which are wholly incorporated herein by reference.

BACKGROUND OF THE INVENTION

The present invention relates generally to models and mannequins used in the field of medicine. More specifically, the present invention relates to models and mannequins used in the field of medicine to teach anatomic body structure and demonstrate surgical procedures and techniques.

Over 4 million American women have undergone breast augmentation surgery in the last 40 years. In 2008 alone, there were over 307,000 breast augmentations and 79,000 breast reconstructions performed in the United States. In addition to the initial surgery, approximately 25% of breast augmentation patients will undergo an implant revision procedure within 3 years after having the initial surgery.

As augmentation surgery is a cosmetic procedure, it is important that the patient be satisfied with the final outcome of their surgery. As a result, during the course of patient education, the physician attempts to provide as much information as possible to the patient regarding the specific procedures and outcomes in order for the patient to better make informed consent about the treatment. It is a known practice to use models to educate patients about the anatomic structures involved so that the patient can better understand the variety of treatment options. In addition, models can be utilized in physician education programs to teach the basic core principals of breast augmentation, reconstruction, and revision of breast implant complications.

To obtain a satisfactory result, understanding and visualizing the final shape and position of the breast on the chest wall is critical to the patient who may be undergoing a breast augmentation or reconstruction. Visual demonstrations of the size of implants, positioning of implants, and the resulting appearance are critical. However, there is a lack of teaching models that are specifically designed to visually demonstrate the underlying anatomical structures of the chest wall, the variable pockets that may be created to receive the implants for augmentation and reconstruction, as well as breast implant complications.

Accordingly, there is a need in the field for a teaching or demonstration model to show the process and finished appearance of breast augmentation and reconstruction, as well as to clearly demonstrate breast implant complications, including but not limited to, implant malposition, rotation of shaped devices, double bubble deformities and asymmetries.

BRIEF SUMMARY OF THE INVENTION

In this regard, the present invention provides for a model or mannequin that is used in the field of medicine to teach anatomic body structure and demonstrate surgical procedures and techniques. Generally, the teaching model of the present invention is designed as a life size replica of a female torso. The model is designed to be an anatomically correct replica including a torso portion with a fabric chest wall, symmetrical pectoralis major muscle layers that are secured to the chest wall and symmetrical breast tissue layers that are secured over the pectoralis muscle layers. The muscle and breast tissue layers can be made from fabric or other pliable materials. Currently available breast implants are utilized by the educator to demonstrate the placement of the implants in various pockets, including subglandular or dual plane (partial submuscular) placements. If necessary the breast tissue, and muscle layers can be elevated to reveal the deeper tissue layers.

As a teaching tool for physicians, the model of the present invention can be used to demonstrate a variety of different conditions and procedures relating to augmentation and reconstruction such as, biodimensional tissue based planning in breast augmentation and reconstruction, understanding of round vs. shaped devices in augmentation and reconstruction and an understanding of how to avoid and revise the most common breast implant malposition and sizing complications. As a teaching tool for patients the model can be used to demonstrate the differences between subglandular and dual plane breast augmentation, biodimensional tissue based breast augmentation and reconstruction, breast implant complications, including but not limited to, malposition deformities, palpability, visibility, capsular contracture, over sizing and under sizing of breast implants, rotation of shaped implants, the different appearance of round and shaped breast implants and the utilization of adjunct procedures such as acellular dermal grafts and fat transfer in augmentation and reconstruction.

It is therefore an object of the present invention to provide a teaching model that improves both patient and physician education in breast augmentation and breast reconstruction which in turn will lead to improved surgical outcomes and reduced reoperation rates. It is a further object of the present invention to provide a tool that provides patients with an improved educational experience that will help patients become better informed and therefore better able to make informed consent. It is still a further object of the present invention to provide a breast implant teaching model that is designed as an educational tool that will enhance the hands on teaching of plastic surgery residents and young plastic surgeons by providing a visual three dimensional anatomic model for use during patient consultations for breast augmentation, reconstruction and revision breast implant procedures.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
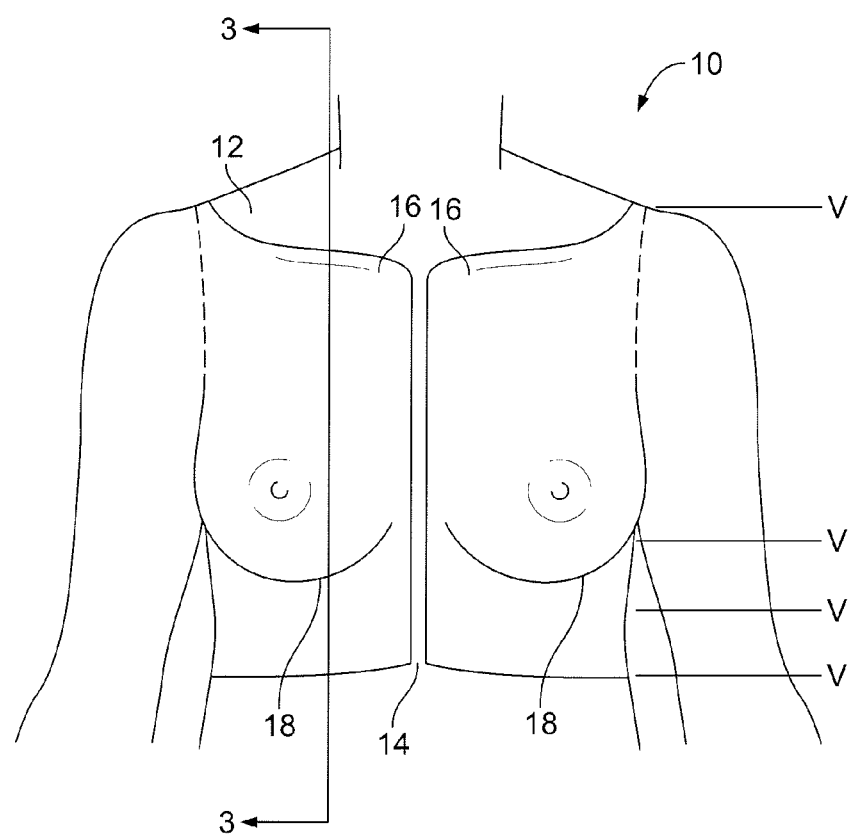
FIG. 1 is a front view of a fully assembled model in accordance with the teachings of the present invention.

Now referring to the drawings, the teaching model of the present invention is shown and generally illustrated in the figures. As can be seen the present invention provides a model or mannequin that is used in the field of medicine to teach anatomic body structure and demonstrate surgical procedures and techniques. Generally, the teaching model of the present invention comprises a life size replica of a female torso which can be placed on a stand or on a table and includes a chest wall having an outer surface, symmetrical pectoralis major muscle layers that can be secured to the chest wall with hook and loop fasteners and symmetrical breast tissue layers that can be secured with hook and loop fasteners over the pectoralis muscle layers.

Turning now to FIG. 1, the teaching model 10 of the present invention can be seen to include a life size replica of a female torso 12 which can be placed on a stand or on a table. The underlying torso 12 is formed to include a chest wall 14 having an outer surface, preferably of fabric, onto which a variety fasteners can be secured in varying locations.

Also seen in FIG. 1 are left and right symmetrical breast tissue layers 16 that are secured onto the torso 12. Within the scope of the present invention it is preferred that fastening of the various layers be accomplished using hook and loop fasteners, however it should be appreciated by one skilled in the art that a variety of different fasteners may also be operative to accomplish the underlying goal of the present invention including, but not limited to, hooks, buttons, snaps, etc. It should also be appreciated that fastening using hook and loop fastener allows a broader range of flexibility in repositioning and adjusting the relative positioning of the tissue layers, therefore making this method of fastening the preferred arrangement.

The breast tissue layers 16 consist of an anterior and posterior fabric surface, filled with a batting material to represent the adult female breast with an anatomically correct nipple-areola. The material may alternately comprise a more durable material as needed. The inframammary fold 18 is delineated with fabric, and has a hook and loop attachment to the mannequin. A second hook and loop attachment is present inferior to the inframammary fold to demonstrate a possible lower inframammary fold that may develop during or after surgery.

Figure 2:
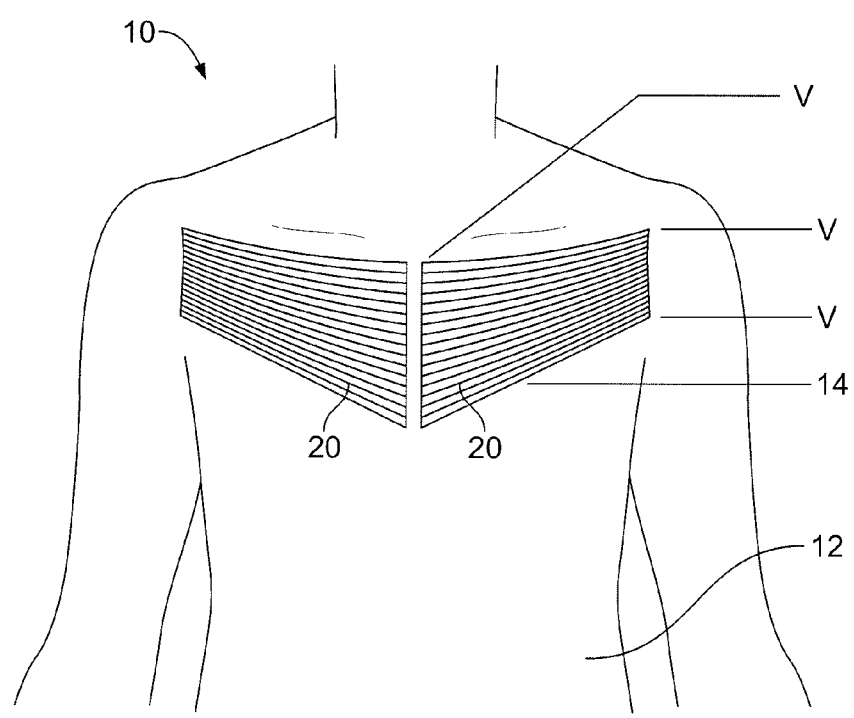
FIG. 2 is a front view of the model in FIG. 1 with the outer layer representing the breast tissue removed.

Turning now to FIG. 2, it can be seen that the breast tissue layers have been removed from the torso to reveal symmetrical pectoralis major muscle layers 20. The muscle layers 20 are secured to the chest wall 14, again with fasteners such as hook and loop fasteners. Preferably, the muscle layers 20 have hook and loop attachments along the sternal border, clavicle and axilla. Hook and loop is also present along anterior axillary line. As can be seen in the figures, the "V" references depict the locations of hook and loop attachments as currently contemplated in the design. Each of the symmetrical muscle sections 20 attach superiorly along the clavicle, medially along the length of the sternum and laterally in the superior axilla near the humeral head. The inferior-lateral attachments are free and not attached to the torso 12. It should be appreciated by one skilled in the art that the particular fastener locations are meant to be illustrative and are not intended to limit the scope of the invention in any manner.

The muscle 20 and breast tissue layers 16 can be made from fabric or other pliable materials. The outer tissue layers are also created out of fabric but could alternately comprise a more lifelike silastic material.

Figure 3:
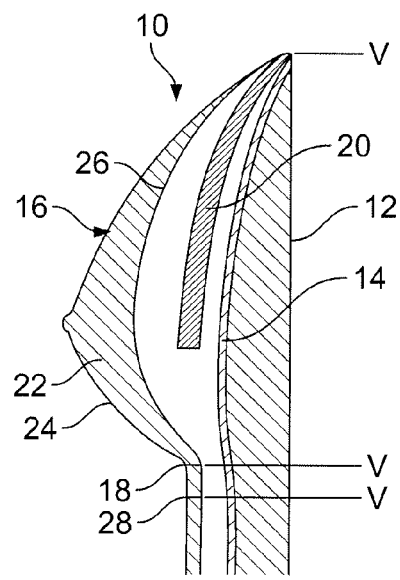
FIG. 3 is a cross sectional view taken along the line 3-3 in FIG. 1.

Turning now to FIGS. 3 and 4, a cross-sectional view of the model of the present invention is depicted. As can be seen the torso wall 14, the pectoralis muscle 20 and anatomic breast layers 16 are all depicted. As can best be seen in cross section, the anatomic breast layers 16 may be a single fabric layer but more preferably are shown to include a soft compressible fill 22 between two fabric layers, representing the anterior skin surface 24 and the deep layer of the breast 26 with a well-defined inframammary fold 18. It can also be seen that material continues below the inframammary fold 18.

As was stated above, the muscle 20 and breast tissue layers 16 are attached to the mannequin 12 with hook and loop. This allows unlimited uses to reproduce breast augmentation, breast reconstruction, breast implant complications and revision breast implant procedures. A hook and loop attachment defines the existing inframammary fold 18. A second optional hook and loop attachment 28 can be secured inferior to the first, to allow for lowering of the fold.

Figures 4A, 4B:
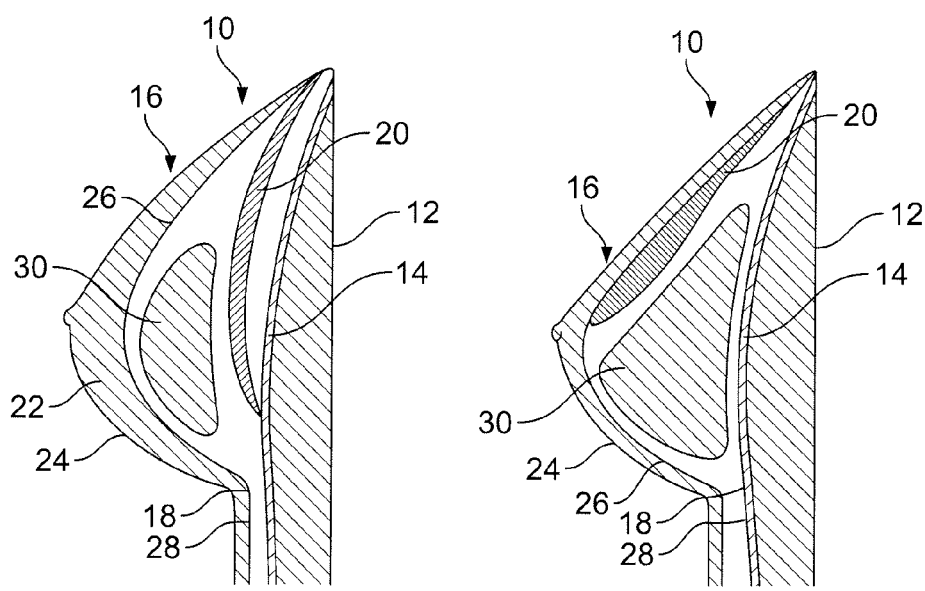
FIG. 4a is the cross section of FIG. 3 showing placement of an implant subglandular.
FIG. 4b is the cross section of FIG. 3 showing partial submuscular placement of an implant.

As seen in FIGS. 4a and 4b, currently available breast implants 30 may be utilized by the educator to demonstrate the placement of the implants 30 in various pockets, including subglandular (as shown at FIG. 4a) or dual plane (partial submuscular as shown at FIG. 4b) placements. The breast tissue 16, and muscle layers 20 can be elevated to reveal the deeper tissue layers if desired.

As a teaching tool for physicians, the model of the present invention can be used to demonstrate a variety of different conditions and procedures relating to augmentation and reconstruction such as, biodimensional tissue based planning in breast augmentation and reconstruction, understanding of round vs. shaped devices in augmentation and reconstruction and an understanding of how to avoid and revise the most common breast implant malposition and sizing complications. As a teaching tool for patients the model can be used to demonstrate the differences between subglandular and dual plane breast augmentation, biodimensional tissue based breast augmentation and reconstruction, breast implant complications, including but not limited to, malposition deformities, palpability, visibility, capsular contracture, over sizing and under sizing of breast implants, rotation of shaped implants, the different appearance of round and shaped breast implants and the utilization of adjunct procedures such as acellular dermal grafts and fat transfer in augmentation and reconstruction.

It can therefore be seen that the present teaching model is an important tool that can improve both patient and physician education in breast augmentation and breast reconstruction and may lead to improved surgical outcomes and reduced reoperation rates. An improved educational experience will help patients become better informed and therefore better able to make informed consent. The breast implant teaching model is designed as an educational tool that will enhance the hands on teaching of plastic surgery residents, and young plastic surgeons. In addition it will provide a visual three dimensional anatomic model for use during patient consultations for breast augmentation, reconstruction and revision breast implant procedures. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:
1. An anatomical model for demonstrating and teaching the principals of breast augmentation/reconstruction procedures comprising:
   a female-shaped torso including an outer chest wall surface;

a loop fabric torso cover covering said torso and being positioned adjacent said chest wall;

symmetrically opposed pectoralis major muscle pieces formed from a loop fabric material and removably affixed over said torso cover using hook fastener material pieces at sternal border, clavicle and axilla positions; and symmetrically opposed breast tissue pieces including an anterior skin surface fabric layer, a posterior deep breast tissue fabric layer, a soft compressible fill between the anterior and posterior layers, and a well-defined inframammary fold, said symmetrically opposed breast tissue pieces being removably affixed over said pectoralis major muscle pieces and said torso cover using hook fastener material pieces at sternal border, clavicle and axilla positions, and further including a first horizontal strip of hook fastener material piece at the inframammary fold and a second horizontal strip of hook fastener material below the inframammary fold, said muscle pieces being detachable from said torso cover and repositionable relative to said torso cover and relative to said breast tissue pieces, said muscle pieces and said torso cover defining a sub-muscular pocket so that an implant may be inserted between said muscle pieces and said torso cover to model a surgical outcome, said breast tissue pieces being detachable from said torso cover and repositionable with respect to said torso cover and said muscle pieces, said breast tissue pieces and said muscle pieces defining a sub-glandular pocket so that an implant may be inserted between said muscle pieces and said breast tissue pieces to model a surgical outcome, said first and second horizontal strips of hook fastener material on said breast tissue pieces being secured to said torso cover to define a normal inframammary fold position, said first horizontal strip of hook fastener material being unsecured to define a disruption of the normal inframammary fold position and resulting location of an implant that has fallen below the normal inframammary fold position.

2. The model of claim 1 further comprising a plurality of implants.

* * * * *